United States Patent [19]

Doubleday et al.

[11] 4,142,654

[45] Mar. 6, 1979

[54] ADJUSTABLE STROKE HAND OPERATED LIQUID DISPENSER

[75] Inventors: Ian E. Doubleday, Sheffield, England; Ronald H. D. F. Lee, deceased, late of Berkhamsted, England, by Stephen R. H. Lee, executor

[73] Assignee: Burroughs Wellcome Co., Research Triangle Park, N.C.

[21] Appl. No.: 773,670

[22] Filed: Mar. 2, 1977

[30] Foreign Application Priority Data

Mar. 2, 1976 [GB] United Kingdom ............... 8308/76

[51] Int. Cl.² .................................... G01F 11/06
[52] U.S. Cl. .................................... 222/309; 222/318; 222/372
[58] Field of Search ............... 222/108, 109, 110, 111, 222/318, 323, 309, 372, 375, 391, 424, 469, 472–474, 571; 239/124, 331; 92/86.5; 417/439

[56] References Cited

U.S. PATENT DOCUMENTS

| 1,639,409 | 8/1927 | Johnson et al. | 222/375 X |
| 1,653,562 | 12/1927 | Grimley | 222/372 X |
| 1,915,443 | 6/1933 | Pelouch | 222/318 |
| 1,979,428 | 11/1934 | Wheeler | 222/309 |
| 2,605,021 | 7/1952 | Churchill et al. | 222/309 X |
| 3,163,360 | 12/1964 | McNinch et al. | 239/124 |
| 3,209,957 | 10/1965 | Sundholm | 222/474 X |
| 3,256,827 | 6/1966 | Smith | 92/86.5 X |
| 3,758,005 | 9/1973 | Christine et al. | 222/309 |
| 3,905,365 | 9/1975 | Colombo | 222/309 X |

*Primary Examiner*—Allen N. Knowles
*Assistant Examiner*—Fred A. Silverberg
*Attorney, Agent, or Firm*—Donald Brown

[57] ABSTRACT

This invention relates to the liquid dispensing of toxic and noxious liquids in such a way that accidental contact with the operator is minimized. This dispenser comprises a sealed cylinder, a piston snuggly fitting inside the cylinder, a pivoted handle, which is limited in its movement by an adjustable screw and a buffer, moves the piston relative to the cylinder, an inlet for feeding liquid into the cylinder, a nozzle at one end of the cylinder for dispensing the liquid from the cylinder, and a drainage outlet at the handle end of the cylinder. Various parts of the dispenser are connected by screw fittings so as to aid in the dispenser's assembly and disassembly.

4 Claims, 3 Drawing Figures

ADJUSTABLE STROKE HAND OPERATED LIQUID DISPENSER

This invention relates to liquid dispensing devices and is particularly concerned with such devices which enable toxic and noxious liquids, especially, to be dispensed in such a way that accidental contact with the operator is minimised.

Many devices for this purpose are in the form of piston pumps comprising a piston moving within a cylinder. In these instances, liquid may unintentionally pass the piston particularly when wear has occurred after a period of time, with the result that the liquid may be transferred to the exterior of the apparatus through gaps between component parts of the device and thus contaminate the operator or his clothing. Since the liquid on the wrong side of the piston could be placed under pressure as the piston returns after a dispensing operation, it is conceivable that the liquid could be ejected from the body of the unit through minute gaps in the form of a mist, spray or jet which could be directed onto the body of the operator.

However it is an object of this invention to minimise the extent of leakage of liquid in such a dispensing device and thus reduce as far as possible the chance of harm to an operator when dispensing toxic and noxious liquids.

Accordingly this invention provides a liquid dispensing device which comprises a sealed cylinder, a piston snuggly fitting inside the cylinder, means for moving the piston relative to the cylinder, an inlet for feeding liquid into the cylinder, an outlet at one end or adjacent to one end of the cylinder for dispensing liquid from the cylinder and a drainage outlet adjacent to the opposite end of the cylinder.

The inlet for feeding liquid into the cylinder is arranged such that liquid will only be fed into the cylinder on the same side of the piston as the outlet. Thus, for example, the inlet may be provided at the same end of the cylinder as the outlet, or in the side of the cylinder or alternatively it may be provided as a passageway passing through the piston. In the case where the inlet is provided in the wall of the cylinder, liquid is only fed into the cylinder when the piston is positioned between the inlet and the outlet, obstructing the flow of liquid from the inlet to the outlet. For optimum working the inlet and outlet incorporate non-return valves.

In one preferred arrangement the inlet comprises an inlet provided in the side of the cylinder, preferably adjacent to that end of the cylinder in which is provided the outlet.

In a further preferred arrangement the inlet comprises an inlet passageway provided through the piston, preferably the inlet passageway is an annular passageway provided through the piston.

Accordingly in a preferred embodiment this invention provides a liquid dispensing device comprising a piston and cylinder assembly with operating means for moving the piston relative to the cylinder, an inlet passageway to the space at one end of the cylinder disposed to one side of the piston, and a dispensing outlet from the space at the one end of the cylinder, and a drainage outlet leading from the space at the other end of the cylinder disposed to the other side of the piston.

With such a device any liquid which enters into the opposite end of the cylinder from the outlet, on the wrong side of the piston, will be caused to leave the cylinder through the drainage outlet which advantageously will be connected back into the container holding the fluid to be dispensed. In one embodiment the piston and cylinder assembly will be constructed to be mounted to the outside of the container.

Preferably the drainage outlet is in the form of outlet ports in the circumferential wall of the other end of the cylinder. Thus movement of the piston within the cylinder is not restricted in any way. Such ports may lead to a surrounding sleeve which is interconnected with a drainage pipe.

In an alternative embodiment the piston and cylinder assembly is constructed to be received within a container of liquid in an axially disposed manner so that the one end of the cylinder will normally be below the level of liquid and the other will be above the liquid level in the container and will preferably project from the container. The dispensing outlet will lead to an outlet pipe which projects out of the container. The device can be operated by a manually operated lever attached to the exterior of the container to actuate the piston-rod to withdraw liquid into the cylinder from the container and therefrom to dispense it into the outlet pipe. In this embodiment it is simplest for the drainage outlet to comprise ports in the circumferential cylinder wall at a location beyond the return stroke of the piston whereby liquid escaping past the piston to the other end of the cylinder may drain back directly into the container.

Advantageously an air intake leads to the other end of the cylinder, so as to alleviate the possibility of a vacuum lock. The air intake will desirably include a non-return valve.

The piston is normally attached to a piston rod which extends through that end of the cylinder adjacent to the drainage outlet.

In order to reduce still further the possibility of liquid passing from the cylinder to the exterior of the device, it is preferred that a wiping washer should be formed around the piston rod at the termination of the end of the cylinder. The piston itself will usually carry one or more washers, etc. and thus prevent as far as possible the passage of liquid from the one side of the piston to the other. The washers may be formed from synthetic or natural rubber or plastics materials or fibrous materials.

In the preferred embodiment of the device, the piston is biased towards that end of the cylinder adjacent to the drainage outlet. The biasing means may be a spring between the piston and the termination of the one end of the cylinder and the spring is advantageously disposed around an extension leading from the one side of the piston.

Ideally the device will be so constructed that the stroke of the piston may be predetermined. Thus the operating means may include a lever for moving the piston assembly relative to the cylinder and a buffer limiting the extent of movement of the lever in an operating direction and movable between positions wherein the effective position of the buffer is varied. Advantageously the device will adapt to dispense limiting the return stroke of the lever with an adjustable stop.

In the preferred embodiment of this invention a lever is pivoted at one end to the end of the piston rod extending from the cylinder and pivoted at the opposite end to an upstanding handle provided on the exterior of the cylinder. Suitably the return stroke of the lever will be limited by an adjustable stop mounted in the upstanding handle. The adjustable stop may, for example, comprise a pivotaly mounted member which has a series of varying sized projections each of which may engage the lever limiting the return stroke when the member is pivoted to a particular position.

The invention also extends to a device as hereinbefore definded in combination with a container for liquid to be dispensed, the inlet passageway leading towards the bottom of the container and the drainage outlet being interconnected with the top of the container.

The invention may be performed in various ways and a preferred embodiment thereof will now be described, with reference to the accompanying drawings, in which.

Figure 1:
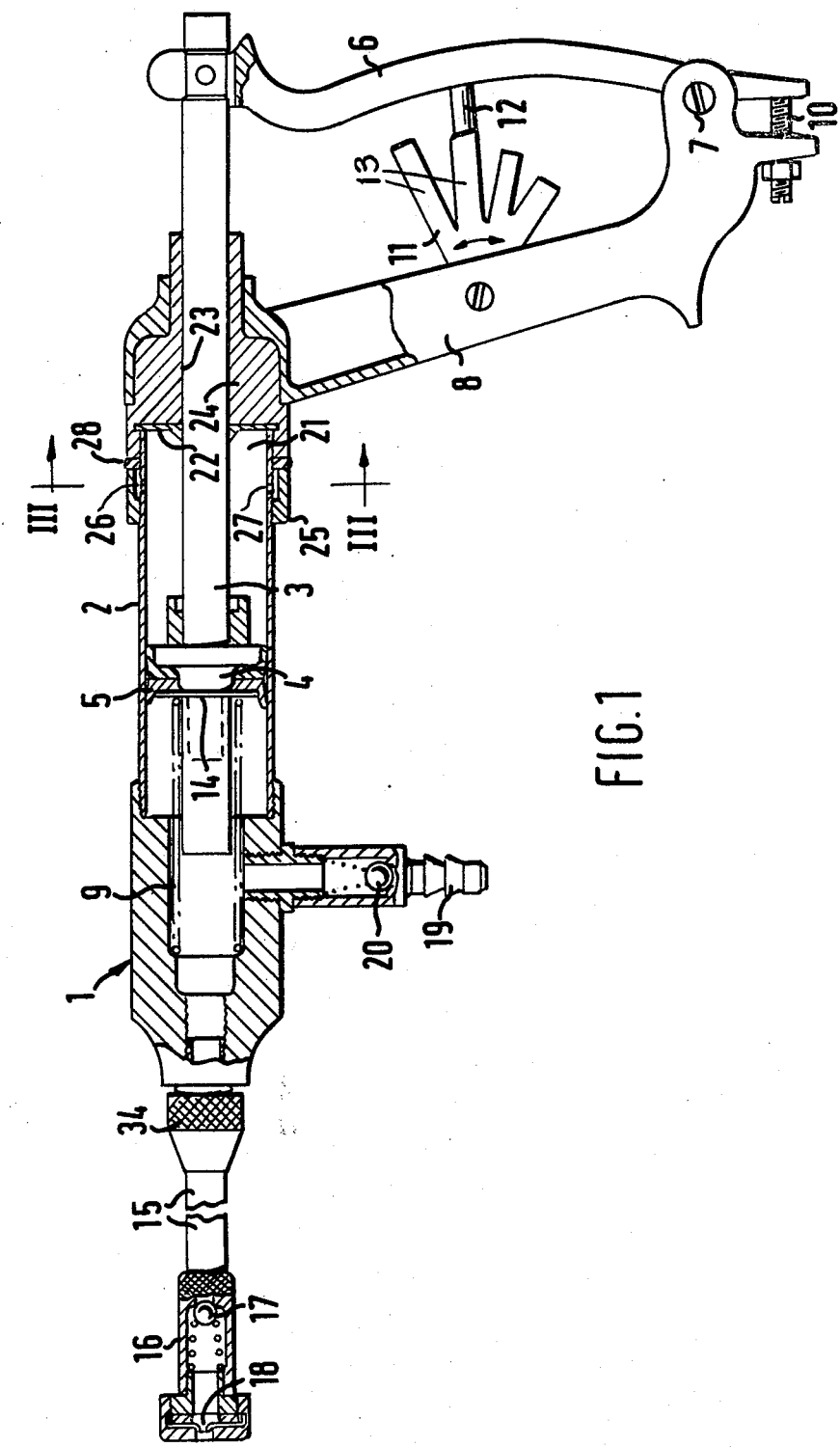
FIG. 1 is a side view, partly in cross-section, of a liquid dispensing gun constructed in accordance with this invention.

The gun shown in FIG. 1 comprises a unit 1 in the form of a cylinder 2 housing a piston rod 3 having a piston 4 which incorporates a pair of piston washers 5 which wipe along the internal surface of the cylinder 2. The piston rod 3 is moved by a lever 6, pivotally mounted at 7 to a pistol-grip handle 8. The piston assembly 3, 4, 5 is biassed by a spring 9 into a return piston which is limited by an adjustable screw 10 co-acting with the end of the lever 6. Forwards or dispensing movement of the piston assembly and its associated lever 6 is also limited by a buffer 11 which abuts a stop 12 on the lever 6. The buffer 11 is rotatable on a rachet to move a different one of a number of fingers 13 into alignment with the stop 12. The fingers 13 are of different lengths and thus determine different strokes of the piston 4 which in turn determines the volume of a dose dispensed by the device.

Upon movement of the lever 6 against the bias of the spring 9 any liquid in the cavity to the one side 14 of the piston 4 will be compressed and forced along a pipe 15 leading to a nozzle 16. The nozzle 16 incorporates a non-return valve 17 and an orifice plate 18. The return stroke of the lever 6 and piston assembly, when hand pressure is released, will cause liquid to be drawn into the cylinder cavity bounded by the face 14 of the piston 4, through an inlet pipe 19 which is also provided with a non-return valve 20.

When the cylinder cavity to the one side 14 of the piston 4 is filled with liquid and a dispensing operation is performed, it is possible that a certain amount of liquid may pass around the washers 5 (particularly after a long period of use resulting in wear of the washers) so that liquid will tend to accumulate within the space 21 of the cylinder 2. As the piston assembly returns under the bias of the spring 9, the accumulated liquid could be forced out through gaps in the device to the exterior where the liquid could contact, or even possibly be sprayed onto, the operator. A wiping washer 22 is provided at the termination of the cylinder 2 and around the piston rod 3 so as to obstruct the passage of liquid between the piston rod 3 and the bore 23 within the body 24 of the device.

Figure 2:
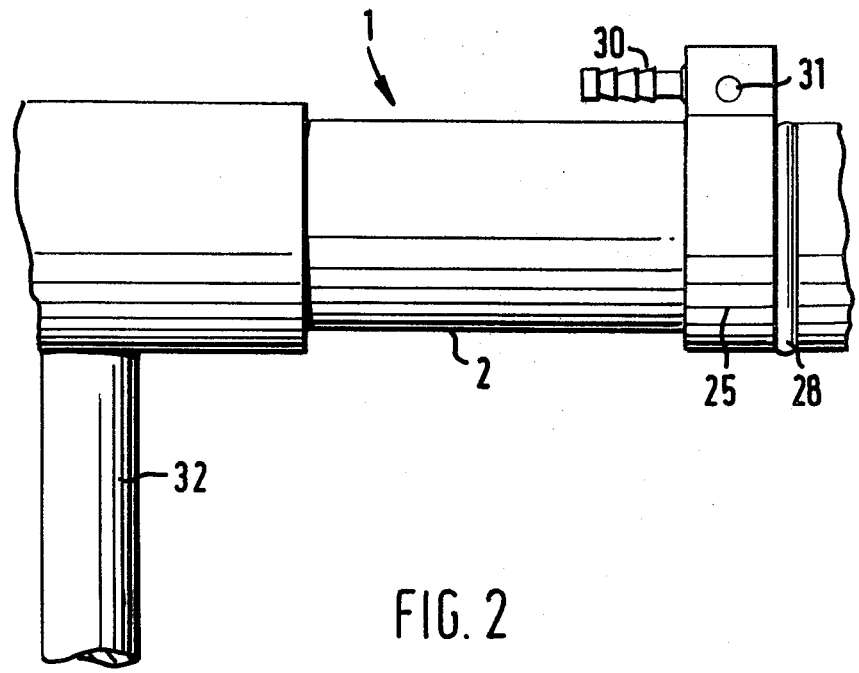
FIG. 2 is a plan view of part of the gun shown in FIG. 1.
Figure 3:
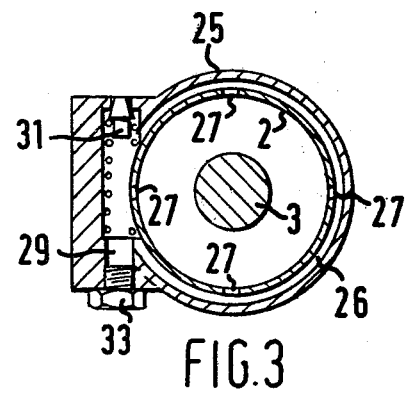
FIG. 3 is a vertical cross-section on line III—III of FIG. 1.

Additionally, however, the device is provided with a sleeve 25 which surrounds the cylinder 2 and forms an annular cavity 26 which communicates with the interior of the cylinder 2 via a plurality of holes 27 (also illustrated in FIG. 3). The sleeve 25 is screwed onto the exterior of the cylinder 2, as is the body portion 24 of the device, and the parts 24 and 25 may be tightened so as to squeeze a sealing ring 28 therebetween. The body part 24 also causes the wiping washer 22 to be held tightly against the end of the cylinder 2. When the piston assembly moves on its return stroke the pressure it creates within the space 21 of the cylinder will be effective to force accumulated liquid within the annular cavity 26 to pass, via a passageway 29 (FIG. 3), into a drainback pipe 30 (FIG. 2). The drainback pipe 30 will lead into the container of liquid into which a dip tube attached to the inlet pipe 19 projects. Since the pressure in the space 21 can be alleviated by passing the liquid through the drainback pipe 30 into the container in this way the chances of such liquid being ejected through other parts of the device are very small.

The collar 25 is also provided with an air intake, non-return, valve 31 which will alleviate any vaccum lock on the operating stroke of the piston assembly. On the return stroke of the piston assembly, a further charge of liquid will pass from the liquid container through the inlet pipe 19 and valve 20 into the cylinder cavity bounded by the face 14. If the liquid container is rigid and not vented to the atmosphere, a condition of partial vacuum will be created within the container which assists the return to the container through the drainback pipe 30, of any liquid present in cylinder space 21. This tendency to create a condition of vacuum is present due to the differential existing between the volume of the space bounded by face 14 and the volume of the space 21 due to the presence within space 21 of the piston rod 3.

The device is additionally provided with a handle support 32 (FIG. 2) to be held by the other hand of the operator and this may be to left or right of the unit, or more conveniently vertically beneath the instrument where it can additionally provide protection and a guard for the non-return valve 20 the inlet pipe 19 and the hose connection from the drainback pipe 30 to the container. Also a plug 33, communicating with the passageway 29 (FIG. 3) is provided to enable fluid within the passageways 26, 29 to be drained off, if required, and to provide access to the valve 31. For ease of packing and washing the various parts of the device may be screwed apart and in particular the pipe 15 may be removed by rotating the knurled nut 34.

As modification to the device the spring 9 could alternatively be positioned about the piston rod 3 between the body part 24 and the lever 6 or within the pistol-grip handle 8, being connected to the lever by a crank about the pivot point 7, in which case the dose adjustment buffer 11 and its co-operating stop 12 must be offset to one side.

What we claim is:

1. In a liquid dispensing device, a tubular barrel defining a chamber, a removably attached nozzle means at one end and a removably attached body part at the other end, said nozzle means containing a stepped bore of two diameters defining a shoulder, the portion of the bore of larger diameter opening into the chamber and in conjunction with the shoulder providing axial and lateral supporting surfaces and the portion of the bore of smaller diameter being internally threaded, said nozzle means further comprising a nozzle provided with a threaded nipple screwed into the threaded smaller bore, said body part containing a through bore of one diameter, a piston rod slidably mounted in the through bore with one end extending outwardly from the through bore and the other end inwardly into the chamber, a piston assembly mounted to the inner end of the piston rod comprising back-to-back, flexible, cup-shaped washers having conical circumferential flanges which diverge from their back-to-back sides, said piston assembly being longitudinally movable in the chamber by reciprocation of the piston rod, an extension extending from the piston rod at the forward side of the piston assembly, a flat surface disposed at the base of the extension against the forwardly-facing, cup-shaped washer of such diameter as to have engagement with the inner side of the flange thereof, said flat surface constituting a supporting surface, a spring mounted in the chamber with one end seated within and against said end and side surface supports in the nozzle means and with its other end seated against said supporting surface provided by the flat surface, said spring yieldably urging the piston assembly rearwardly in the chamber, a handle fixed to the body part, a lever pivotally mounted near one end to the distal end of the handle, means pivotally connecting the other end of the lever to the protruding end of the piston rod such that pivotal movement of the lever about its pivot will effect reciprocation of the rod, said nozzle means containing a valve inlet in communication with the larger diameter portion of the bore through which fluid is drawn into the chamber during retraction of the piston, said valve inlet preventing reverse flow of fluid, said tubular body containing at its rear end peripherally-disposed holes a plane disposed about the barrel defining a annular cavity about the barrel with which the holes are in communication for receiving fluid which escapes from the forward side of the piston to the rear side, said sleeve containing a drainage port and a check valve mounted to the sleeve and in communication therewith arranged to permit the entrance of air into the annular cavity on the forward stroke of the piston.

2. A liquid dispensing device according to claim 1 wherein there is a flexible wiper washer disposed about the piston rod at the rear end of the chamber.

3. A dispensing device according to claim 1 wherein an end part of the lever extends beyond the pivot and there is an adjustable screw screwed into the handle against said end part in a position to limit clockwise rotation of the lever on its pivot.

4. A dispensing device according to claim 1 wherein there is a stop fixed to the lever intermediate its pivoted ends, a buffer pivoted to the handle opposite the stop provided with angularly disposed fingers of different length representing different dosages, pivotally movable to bring a predetermined finger into alignment with the stud to limit forward movement of the piston.

* * * * *